Nov. 10, 1953 W. H. HUGGINS ET AL 2,658,994

PANORAMIC FREQUENCY INDICATOR

Filed Dec. 10, 1945

INVENTORS.
WILLIAM H. HUGGINS
PAUL I. RICHARDS
BY William D. Hall
ATTORNEY

Patented Nov. 10, 1953 2,658,994

UNITED STATES PATENT OFFICE 2,658,994

PANORAMIC FREQUENCY INDICATOR

William H. Huggins and Paul I. Richards, Cambridge, Mass., assignors to the United States of America as represented by the Secretary of War Application December 10, 1945, Serial No. 634,101

7 Claims. (Cl. 250—20)

This invention relates to electrical circuits and particularly to frequency-selecting circuits.

In systems for determining the frequency of received radio signals, especially where the system is being employed to transmit signals of the same frequency as the incoming signals, it is desirable that slight frequency differences between signals be measured to a high degree of accuracy. Furthermore, in heterodyne systems of this character, it is essential that the upper and lower conversion images be distinguished.

A primary object of the present invention is to facilitate the measurement of radio signal frequencies.

A further object of the present invention is to cause the intermediate-frequency pass band of a heterodyne receiver to be analyzed for the presence of incoming signals in a highly accurate and rapid manner.

A still further object is to display on an indicator a panoramic presentation of the intermediate frequency pass band.

Another object is to enable the conversion images to be readily distinguished.

Other objects, features and advantages of this invention will suggest themselves to those skilled in the art and will become apparent from the following description of the invention taken in connection with the accompanying drawing in which.

Figure 1:
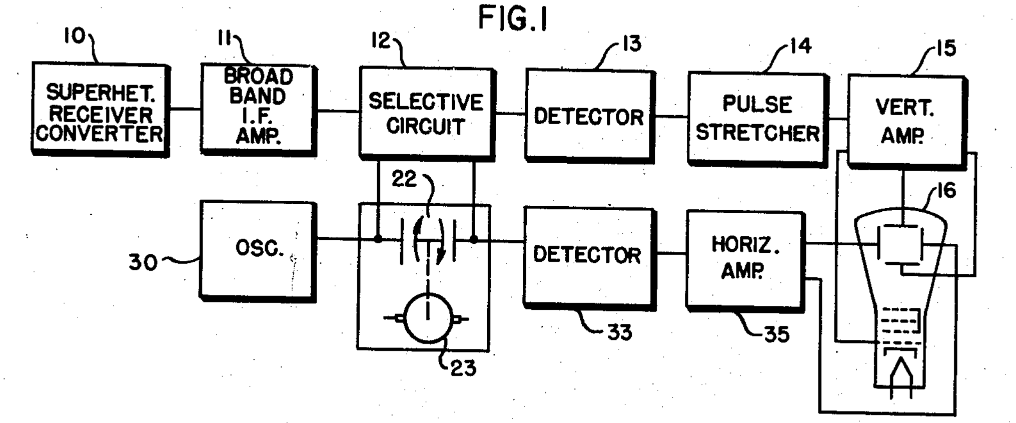
Fig. 1 is a block diagram of a radio system embodying the present invention.

Referring to the block diagram of Fig. 1, the present invention is adapted to be used in conjunction with a superheterodyne radio receiver 10 having a broad-band intermediate-frequency amplifier 11 which is designed to have substantially constant amplification over its pass band. Incoming radio-frequency signals may be converted to intermediate-frequency signals within the pass band of amplifier 11 by means of a heterodyne oscillator and mixer included in the receiver 10, and are then amplified by the amplifier 11. A selective coupling circuit 12 having a very narrow pass band is interposed between the amplifier 11 and the detector stage 13. The pass band of the coupling circuit 12 may be shifted in frequency to select the signals within any portion of the pass band of the amplifier 11. As will be explained in greater detail hereinafter, the tuning of the circuit 12 is varied continuously so that its narrow pass band sweeps back and forth across the band of frequencies passed by amplifier 11. The detected signals, after passing through a pulse stretcher 14, are amplified by a vertical amplifier 15, which may include a stage of video amplification followed by a phase inverter, and are then applied to the vertical deflection elements of a cathode ray tube indicator 16. A portion of the signal is also applied to the intensifier grid of the cathode ray tube in order to intensify the peaks of the signal as displayed on the indicator 16.

Figure 2:
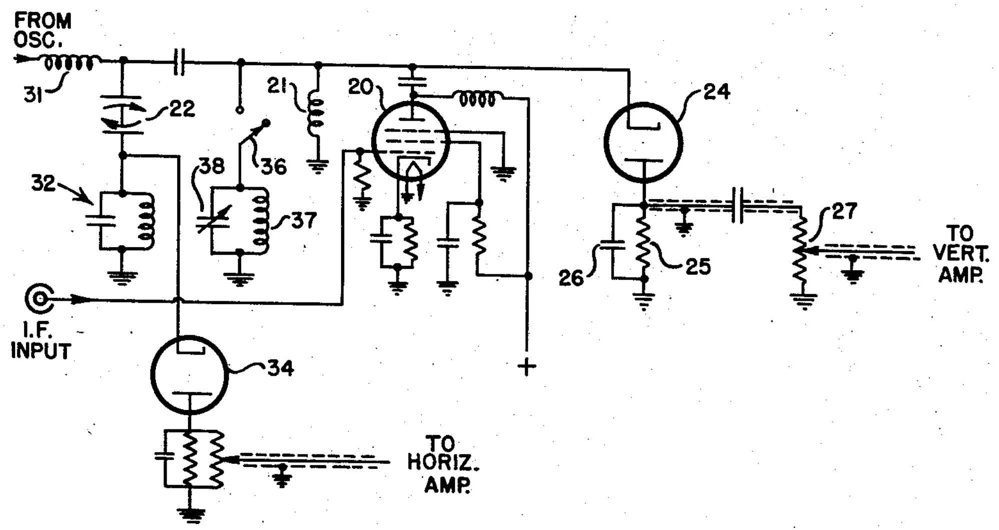
Fig. 2 is a schematic diagram of certain components shown in Fig. 1.

Details of the selective coupling circuit 12 of Fig. 1 are shown in Fig. 2. The intermediate-frequency signal from the broad-band amplifier 11 is applied to the control grid of a pentode amplifier 20. The plate circuit of the tube 20 includes an inductance 21 and a variable condenser 22 so arranged that only signals lying within a limited band of frequencies are passed by the tube 20. The capacity of the condenser 22 is continuously varied by a direct-current motor 23, Fig. 1, which is mechanically coupled to the rotor of the condenser 22. The motor-driven condenser 22 is incorporated also in the horizontal sweep circuit of the indicator 16, as will be explained.

The output of pentode 20, Fig. 2, is passed through a diode detector 24 having associated therewith a pulse stretcher comprising the parallel combination of a resistor 25 and a condenser 26. The resulting video signal is taken from a volume control potentiometer 27 and passed through the vertical amplifier 15.

The horizontal sweep voltage is derived from a low-frequency oscillator 30, Fig. 1, the frequency of which is substantially fixed and the output of which is applied through a radio-frequency choke 31, Fig. 2, of low impedance to the oscillator current to the high-potential terminal of the condenser 22. The low-potential side of the condenser 22 is connected through a parallel resonant "trap" 32 to ground. That portion of the output of the oscillator 30 which appears across the trap 32 varies in amplitude as the capacity of the condenser 22 is varied. This variable amplitude portion of the oscillator output is applied to a detector 33, Fig. 1, which includes a diode 34, Fig. 2. Thus, as condenser 22 is rotated, the output of oscillator 30 is amplitude modulated, and detector 33 derives the modulation envelope. The output of the diode 34, comprising a substantially triangular wave, is applied to the horizontal amplifier 35 which preferably has embodied therein a phase inverter. Because of the fact that the motor-driven condenser 22 is included in both the vertical and horizontal deflecting circuits, the triangular deflecting voltage is applied to the horizontal deflecting elements of the cathode ray tube 16 in synchronism with the sweep tuning of the selective coupling circuit 12 across the intermediate-frequency pass band.

Figure 3:
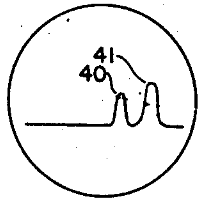
Fig. 3 is a diagram of a panoramic display as viewed on an indicator in the present system.

A receiving system as described above may readily be used in conjunction with a transmitter for transmitting a signal of the same frequency as the received signal, as is well known in the art. As shown in Fig. 3, the traces of the transmitted and received signals may appear on the indicator somewhat as represented by the peaks or "blips" 40 and 41. The lateral position of each peak as 40 or 41 indicates the frequency of the corresponding signal relative to the upper and lower limits of the frequency range through which the selective circuit 12 sweeps, the maximum point of each peak occurring at the frequency of the corresponding signal. The transmitter tuning should then be adjusted until the lateral positions of the peaks coincide. Such coincidence indicates that the frequency of the transmitted signal is equal to that of either the received signal or its heterodyne conversion image. To insure that the transmitter is tuned to the frequency of the incoming signal and not its conversion image, it is merely necessary to change slightly the frequency of the local oscillator (not shown) in the receiver 10. If the peaks 40 and 41 move away from each other on the indicator screen, this signifies that the transmitted signal has been matched to the image of the incoming signal.

The bandwidth of the selective circuit 12, Fig. 1, may be changed by throwing the switch 36, Fig. 2, to connect the parallel combination of inductance 37 and condenser 38 in circuit with the inductance 21 and condenser 22.

The present invention affords a convenient means of examining desired frequency sectors within the pass band of an intermediate-frequency amplifier. This enables the measurement of slight frequency differences between signals to be made to a higher degree of accuracy than by the more usual method of varying the frequency of the local oscillator in the receiver. A circuit of this character is also advantageous inthat it enables the operator readily to determine which of the two conversion images is being utilized.

While there has been described what is at present considered to be the preferred embodiment of this invention, it will be obvious to those skilled in the art that various changes and modifications may be made therein without departing from the scope of the invention.

The invention claimed is:

1. In a system for indicating the frequency of currents over a predetermined frequency range, a receiver including a resonant network upon which currents within said frequency range are impressed, a detector coupled to the output of said resonant network, said resonant network including a reactance in parallel with a pair of series-connected elements one of which is reactive and variable over a range sufficient to selectively tune said resonant circuit to any portion of said frequency range, a second detector coupled across one of said elements, an oscillator independent of said receiver and connected to said series-connected elements through an impedance which is low at the oscillator frequency, and indicator means coupled to the outputs of said detectors.

2. In a panoramic frequency indicator for indicating the frequency of currents over a predetermined frequency range, a receiver including a resonant network upon which currents within said frequency range are impressed, a detector coupled to the output of said resonant network, a cathode ray tube, means in said tube coupled to said detector for controlling the beam of said tube, said resonant network comprising a variable condenser in series with a parallel-resonant circuit, a second detector connected to be responsive to the output of said parallel-resonant circuit, an oscillator independent of said receiver for generating a fixed frequency and connected across said network in series with a reactance which is low at the oscillator frequency, and means in said tube coupled to said second detector for deflecting the beam of said tube.

3. In a panoramic frequency indicator for indicating the frequency of currents over a predetermined frequency range, a receiver including a broad band heterodyne converter for simultaneously changing all frequencies within said range to a second frequency range, a resonant network upon which currents within said second frequency range are impressed, a cathode ray tube, means in said tube connected to be responsive to the output of said resonant network for controlling the beam of said tube, said resonant network comprising a pair of series-connected elements one of which is reactive and variable over a range sufficient to selectively tune said resonant network to any portion of said second frequency range, an oscillator independent of said receiver for generating a fixed frequency and connected to said series-connected elements in series with an inductance having a low impedance to the frequency of said oscillator, and means in said tube and coupled to one of said elements for deflecting the beam of said tube as a function of the amplitude of the signals across said one of said elements.

4. In an oscilloscope system, means for generating a periodic time base for the oscilloscope comprising a network having a pair of series-connected circuit elements, one of said elements being a variable reactance element, means for applying oscillations across said network, means for periodically varying said reactance element to amplitude modulate the energy in said network, a modulation envelope detector circuit connected across one of said elements for deriving the modulation envelope of said modulated energy, and a circuit for applying said modulation envelope as a sweep voltage to said oscilloscope.

5. In an oscilloscope system, means for generating a periodic time base for the oscilloscope comprising a fixed-frequency oscillator, means connecting the output of said oscillator across a network comprising at least a pair of series connected circuit elements, at least one of said elements being a variable capacity, means for periodically varying said capacity to amplitude modulate the energy in said network, a modulation envelope detector circuit connected across the other of said circuit elements for deriving the modulation envelope of said modulated energy, and a circuit for applying said modulation envelope as a sweep voltage to said oscilloscope.

6. In an oscilloscope system, means for generating a periodic time base for the oscilloscope comprising a fixed-frequency oscillator, means connecting the output of said oscillator across a network having a pair of series-connected circuit elements, one of said elements being a variable capacity and the other of said elements being a parallel-resonant circuit, means for periodically varying said capacity to amplitude modulate the energy in network, a modulation envelope detector circuit connected across said parallel-resonant circuit for deriving the modulation envelope of said modulated energy, and a circuit for applying said modulation envelope as a sweep voltage to said oscilloscope.

7. In a system for indicating the frequency of currents over a predetermined frequency range, a receiver upon which said currents are applied, means including a varying impedance element for successively tuning said receiver to different frequencies of said range, a source of oscillations independent of said receiver, a circuit including said varying impedance element for amplitude modulating the output of said source, an amplitude modulation detector for deriving the modulation envelope of said output, an oscilloscope, means for controlling the beam of said oscilloscope in accordance with the output of said receiver, and means for applying said modulation envelope to said oscilloscope to deflect the beam thereof to provide a time base.

WILLIAM H. HUGGINS.
PAUL I. RICHARDS.

References Cited in the file of this patent

UNITED STATES PATENTS

| Number | Name | Date |
|---|---|---|
| 2,279,246 | Podliasky | Apr. 7, 1942 |
| 2,367,907 | Wallace | Jan. 23, 1945 |
| 2,381,940 | Wallace | Aug. 14, 1945 |
| 2,387,685 | Sanders | Oct. 23, 1945 |
| 2,445,562 | Cawein et al. | July 20, 1948 |

OTHER REFERENCES

Electronic Industries, "Panoramic Principles," July 1944, pages 86, 87, 88, 106.